United States Patent
Slutzky et al.

(10) Patent No.: US 11,135,936 B2
(45) Date of Patent: Oct. 5, 2021

(54) METHODS FOR USING TEMPERATURE DATA TO PROTECT ELECTRIC VEHICLE BATTERY HEALTH DURING USE OF BIDIRECTIONAL CHARGER

(71) Applicant: Fermata, LLC, Charlottesville, VA (US)

(72) Inventors: David Lee Slutzky, Charlottesville, VA (US); John Parsons Wheeler, Charlottesville, VA (US)

(73) Assignee: FERMATA, LLC, Charlottesville, VA (US)

( * ) Notice: Subject to any disclaimer, the term of this patent is extended or adjusted under 35 U.S.C. 154(b) by 18 days.

(21) Appl. No.: 16/802,808

(22) Filed: Feb. 27, 2020

(65) Prior Publication Data

US 2020/0282855 A1    Sep. 10, 2020

Related U.S. Application Data

(60) Provisional application No. 62/814,712, filed on Mar. 6, 2019.

(51) Int. Cl.
*H02J 7/00* (2006.01)
*B60L 53/63* (2019.01)
(Continued)

(52) U.S. Cl.
CPC .............. *B60L 53/63* (2019.02); *B60L 53/64* (2019.02); *B60L 58/25* (2019.02); *H02J 7/007194* (2020.01); *H02J 2310/64* (2020.01)

(58) Field of Classification Search
None
See application file for complete search history.

(56) References Cited

U.S. PATENT DOCUMENTS

| | | |
|---|---|---|
| 7,274,975 B2 | 9/2007 | Miller |
| 7,590,472 B2 | 9/2009 | Hakim et al. |
| | (Continued) | |

FOREIGN PATENT DOCUMENTS

| | | |
|---|---|---|
| CN | 109546855 A | 3/2019 |
| EP | 2 546 094 A1 | 1/2013 |
| | (Continued) | |

OTHER PUBLICATIONS

European Patent Office, Invitation to Pay Additional Fees and Where Applicable, Protest Fee and Partial International Search Report issued in International Patent Application No. PCT/US2020/020309, dated Jun. 5, 2020.
(Continued)

*Primary Examiner* — Arun C Williams
(74) *Attorney, Agent, or Firm* — Baker Botts L.L.P.

(57) ABSTRACT

The present invention describes a method using temperature data to protect battery health during bidirectional charging in conjunction with monetization activities. The method includes receiving temperature data and determining anticipated energy needs of a building. The temperature data includes at least the temperature of one or more electric vehicle batteries or information required to determine the temperature of the one or more electric vehicle batteries while the anticipated energy needs are relative to ambient air temperature. The method includes determining an amount of discharge of the one or more electric vehicle batteries required to offset the anticipated needs of the building by a predetermined amount and determining based on the temperature data whether discharging the one or more electric vehicle batteries would be harmful to the health of the one or more electric vehicle batteries. The method includes discharging the one or more electric vehicle batteries to offset the anticipated needs of the building.

20 Claims, 6 Drawing Sheets

(51) Int. Cl.
    *B60L 53/64*     (2019.01)
    *B60L 58/25*     (2019.01)

(56) References Cited

U.S. PATENT DOCUMENTS

| | | | |
|---|---|---|---|
| 7,599,196 B2 | 10/2009 | Alexander | |
| 7,656,016 B2 | 2/2010 | Yoshimatsu et al. | |
| 7,747,739 B2 | 6/2010 | Bridges et al. | |
| 7,778,045 B2 | 8/2010 | Alexander | |
| 7,783,390 B2 | 8/2010 | Miller | |
| 7,844,370 B2 | 11/2010 | Pollack et al. | |
| 7,886,166 B2 | 2/2011 | Shnekendorf et al. | |
| 7,949,435 B2 | 3/2011 | Pollack et al. | |
| 7,957,846 B2 | 6/2011 | Hakim et al. | |
| 8,103,389 B2 | 1/2012 | Golden et al. | |
| 8,116,915 B2 | 2/2012 | Kempton | |
| 8,295,069 B2 | 10/2012 | Alexander | |
| 8,300,426 B2 | 10/2012 | Alexander | |
| 8,345,452 B2 | 1/2013 | Alexander | |
| 8,346,401 B2 | 1/2013 | Pollack et al. | |
| 8,391,033 B2 | 3/2013 | Alexander | |
| 8,395,910 B2 | 3/2013 | Alexander | |
| 8,400,800 B2 | 3/2013 | Alexander | |
| 8,406,025 B1 | 3/2013 | Alexander | |
| 8,432,711 B1 | 4/2013 | Alexander | |
| 8,441,819 B2 | 5/2013 | Alexander | |
| 8,446,042 B2 | 5/2013 | Bundschuh et al. | |
| 8,446,043 B1 | 5/2013 | Bundschuh et al. | |
| 8,446,745 B1 | 5/2013 | Alexander | |
| 8,451,637 B1 | 5/2013 | Alexander | |
| 8,461,718 B2 | 6/2013 | Bundschuh et al. | |
| 8,471,408 B2 | 6/2013 | Bundschuh et al. | |
| 8,509,976 B2 | 8/2013 | Kempton | |
| 8,676,389 B2 | 3/2014 | Golden et al. | |
| 8,781,809 B2 | 7/2014 | Bridges | |
| 8,796,881 B2 | 8/2014 | Davis | |
| 8,810,192 B2 | 8/2014 | Bridges et al. | |
| 8,849,687 B2 | 9/2014 | Hakim et al. | |
| 8,855,829 B2 | 10/2014 | Golden et al. | |
| 8,862,280 B1 | 10/2014 | Dyess et al. | |
| 8,898,278 B2 | 11/2014 | Bridges et al. | |
| 8,903,560 B2 | 12/2014 | Miller | |
| 9,007,796 B2 | 4/2015 | Alexander | |
| 9,029,909 B2 | 5/2015 | Blanchard et al. | |
| 9,031,708 B2 | 5/2015 | Penzenstadler et al. | |
| 9,035,350 B2 | 5/2015 | Blanchard et al. | |
| 9,042,131 B2 | 5/2015 | Barron et al. | |
| 9,043,038 B2 | 5/2015 | Kempton | |
| 9,054,706 B2 | 6/2015 | Blanchard et al. | |
| 9,054,707 B2 | 6/2015 | Blanchard et al. | |
| 9,059,710 B2 | 6/2015 | Blanchard et al. | |
| 9,077,185 B2 | 7/2015 | Alexander | |
| 9,116,519 B2 | 8/2015 | Mello | |
| 9,118,247 B2 | 8/2015 | Alexander | |
| 9,124,095 B1 | 9/2015 | Barron et al. | |
| 9,130,461 B2 | 9/2015 | Alexander | |
| 9,176,491 B2 | 11/2015 | Dyess | |
| 9,190,894 B2 | 11/2015 | Alexander et al. | |
| 9,203,400 B2 | 12/2015 | Alexander et al. | |
| 9,203,401 B2 | 12/2015 | Alexander et al. | |
| 9,209,713 B2 | 12/2015 | Alexander et al. | |
| 9,209,798 B2 | 12/2015 | Alexander et al. | |
| 9,219,406 B1 | 12/2015 | Alexander | |
| 9,231,582 B1 | 1/2016 | Alexander et al. | |
| 9,270,142 B2 | 2/2016 | Alexander | |
| 9,283,862 B2 | 3/2016 | Bridges et al. | |
| 9,293,946 B2 | 3/2016 | Alexander | |
| 9,337,262 B2 | 5/2016 | Blanchard | |
| 9,355,853 B2 | 5/2016 | Blanchard et al. | |
| 9,356,595 B2 | 5/2016 | Alexander et al. | |
| 9,369,125 B2 | 6/2016 | Alexander et al. | |
| 9,374,084 B2 | 6/2016 | Alexander et al. | |
| 9,374,085 B2 | 6/2016 | Alexander et al. | |
| 9,397,580 B1 | 7/2016 | Alexander et al. | |
| 9,407,133 B2 | 8/2016 | Alexander | |
| 9,431,888 B1 | 8/2016 | Alexander | |
| 9,436,199 B2 | 9/2016 | Dyess et al. | |
| 9,436,948 B2 | 9/2016 | Bridges et al. | |
| 9,444,449 B2 | 9/2016 | Alexander et al. | |
| 9,520,764 B1 | 12/2016 | Bundschuh et al. | |
| 9,614,028 B2 | 4/2017 | Blanchard | |
| 9,614,458 B1 | 4/2017 | Alexander | |
| 9,647,526 B1 | 5/2017 | Alexander | |
| 9,647,553 B2 | 5/2017 | Alexander et al. | |
| 9,647,568 B1 | 5/2017 | Bundschuh et al. | |
| 9,660,551 B2 | 5/2017 | Alexander | |
| 9,674,771 B2 | 6/2017 | Bridges et al. | |
| 9,678,519 B1 | 6/2017 | Alexander | |
| 9,679,999 B2 | 6/2017 | Blanchard | |
| 9,704,381 B2 | 7/2017 | Mello | |
| 9,742,385 B2 | 8/2017 | Alexander | |
| 9,742,395 B2 | 8/2017 | Alexander et al. | |
| 9,754,300 B2 | 9/2017 | Kempton et al. | |
| 9,786,773 B2 | 10/2017 | Alexander | |
| 9,787,298 B2 | 10/2017 | Alexander et al. | |
| 9,787,304 B2 | 10/2017 | Alexander et al. | |
| 9,796,258 B1 | 10/2017 | Bundschuh et al. | |
| 9,818,615 B2 | 11/2017 | Blanchard et al. | |
| 9,880,577 B2 | 1/2018 | Dyess et al. | |
| 9,899,868 B2 | 2/2018 | Bundschuh et al. | |
| 9,899,932 B2 | 2/2018 | Alexander | |
| 9,900,002 B2 | 2/2018 | Alexander et al. | |
| 10,054,325 B2 | 8/2018 | Dyess | |
| 10,056,372 B2 | 8/2018 | Alexander | |
| 10,088,185 B2 | 10/2018 | Taylor et al. | |
| 10,279,698 B2 | 5/2019 | Bridges et al. | |
| 10,724,752 B2 | 7/2020 | Dyess et al. | |
| 10,843,580 B2 | 11/2020 | Pollack et al. | |
| 10,866,609 B2 | 12/2020 | Dyess et al. | |
| 2006/0158037 A1 | 7/2006 | Danley et al. | |
| 2007/0203860 A1 | 8/2007 | Golden et al. | |
| 2008/0039979 A1 | 2/2008 | Bridges et al. | |
| 2008/0040223 A1 | 2/2008 | Bridges et al. | |
| 2008/0040263 A1 | 2/2008 | Pollack et al. | |
| 2008/0040295 A1 | 2/2008 | Kaplan et al. | |
| 2008/0040296 A1 | 2/2008 | Bridges et al. | |
| 2008/0052145 A1 | 2/2008 | Kaplan et al. | |
| 2008/0249965 A1 | 10/2008 | Pollack et al. | |
| 2009/0024545 A1 | 1/2009 | Golden et al. | |
| 2009/0040029 A1 | 2/2009 | Bridges et al. | |
| 2009/0043519 A1 | 2/2009 | Bridges et al. | |
| 2009/0043520 A1 | 2/2009 | Pollack et al. | |
| 2009/0066287 A1 | 3/2009 | Pollack et al. | |
| 2009/0088907 A1 | 4/2009 | Lewis et al. | |
| 2009/0228388 A1 | 9/2009 | Axelrod et al. | |
| 2011/0001356 A1 | 1/2011 | Pollack | |
| 2011/0004358 A1 | 1/2011 | Pollack et al. | |
| 2011/0004406 A1 | 1/2011 | Davis | |
| 2011/0007824 A1 | 1/2011 | Bridges et al. | |
| 2011/0010043 A1 | 1/2011 | Lafky | |
| 2011/0016063 A1 | 1/2011 | Pollack et al. | |
| 2011/0025556 A1 | 2/2011 | Bridges et al. | |
| 2013/0041853 A1 | 2/2013 | Shnekendorf et al. | |
| 2014/0232180 A1* | 8/2014 | Kinomura | H02J 7/34 307/9.1 |
| 2014/0312841 A1* | 10/2014 | Baba | B60L 55/00 320/109 |
| 2014/0320083 A1* | 10/2014 | Masuda | B60L 55/00 320/109 |
| 2015/0112763 A1 | 4/2015 | Goldschneider | |
| 2015/0142193 A1 | 5/2015 | Golden et al. | |
| 2015/0160672 A1 | 6/2015 | Hakim et al. | |
| 2015/0207319 A1 | 7/2015 | Miller | |
| 2016/0204714 A1 | 7/2016 | Alexander | |
| 2016/0269021 A1 | 9/2016 | Blanchard | |
| 2016/0322350 A1 | 11/2016 | Blanchard | |
| 2016/0322484 A1 | 11/2016 | Blanchard | |
| 2016/0357209 A1 | 12/2016 | Dyess et al. | |
| 2017/0186107 A1 | 6/2017 | Golden et al. | |
| 2017/0279274 A9 | 9/2017 | Penzenstadler et al. | |
| 2017/0288561 A1 | 10/2017 | Lemberg et al. | |
| 2017/0317575 A1 | 11/2017 | Alexander | |
| 2018/0004239 A1 | 1/2018 | Golden et al. | |
| 2018/0026122 A1 | 1/2018 | Blanchard et al. | |

(56) References Cited

U.S. PATENT DOCUMENTS

| | | |
|---|---|---|
| 2018/0098271 A1 | 4/2018 | Bridges et al. |
| 2018/0122222 A1 | 5/2018 | Mello |
| 2018/0152095 A1 | 5/2018 | Bai et al. |
| 2018/0170207 A1 | 6/2018 | Ko |
| 2018/0262019 A1 | 9/2018 | Homma |
| 2020/0052492 A1 | 2/2020 | Rive et al. |

FOREIGN PATENT DOCUMENTS

| | | |
|---|---|---|
| GB | 2 562 532 A | 11/2018 |
| WO | 2010/053872 A1 | 5/2010 |
| WO | 2010/091743 A2 | 8/2010 |
| WO | 2018/084151 A1 | 5/2018 |
| WO | 2019199964 A1 | 10/2019 |

OTHER PUBLICATIONS

European Patent Office, International Search Report issued in International Application No. PCT/US2020/061910, dated Mar. 1, 2021.

European Patent Office, Written Opinion of the International Searching Authority issued in International Application No. PCT/US2020/061910, dated Mar. 1, 2021.

Golden et al., U.S. Appl. No. 15/072,922, entitled "Modular Energy Control System", filed in the U.S. Patent and Trademark Office on Mar. 17, 2016.

Golden et al., U.S. Appl. No. 15/808,120, entitled "Modular Energy Control System", filed in the U.S. Patent and Trademark Office on Nov. 9, 2017.

Hakim et al., U.S. Appl. No. 12/470,224, entitled "Energy Arbitrage By Load Shifting", filed in the U.S. Patent and Trademark Office on May 21, 2009.

* cited by examiner

METHODS FOR USING TEMPERATURE DATA TO PROTECT ELECTRIC VEHICLE BATTERY HEALTH DURING USE OF BIDIRECTIONAL CHARGER

CROSS-REFERENCE TO RELATED APPLICATION

This application claims the benefit of U.S. Provisional Patent Application No. 62/345,859 filed on Jun. 5, 2016, the disclosure of which is incorporated herein by reference in its entirety.

BACKGROUND

The present disclosure generally relates to using temperature data to protect battery health during bidirectional charging of an electric vehicle, including bidirectional charging which is related to revenue generating and/or leads to cost saving.

As concerns for the environment and depletion of resources increase, the use of plug-in electric vehicles has become more popular. Such vehicles include battery electric vehicles (BEVs), plug-in hybrid electric vehicles (PHEVs), and hydrogen fuel cell electric vehicles (FCEVs). These vehicles typically include one or more electric motors that are powered by one or more batteries. There are different types of electric vehicle batteries, such as lead-acid, nickel metal hydride, sodium, and lithium-ion. Each such battery may be provided in different storage capacities, which are generally measured in kilowatt-hours ("kWh").

As the use of electric vehicles has become more prevalent and the availability of such vehicles has increased, attempts have been made to utilize them for bidirectional charging, including for example, in revenue generating and/or cost saving activities, such as vehicle-to-grid activities. Conventional vehicle-to-grid activities include demand response services, such as discharging electricity from the electric vehicle batteries to the power grid or throttling the batteries' charging rate as charging costs change. Conventional vehicle-to-grid systems generally do not consider factors related to battery health while performing such activities, such as the temperature of the electric vehicle batteries.

BRIEF SUMMARY

The present disclosure is directed to systems, apparatus, methods, and computer program products for using temperature data to protect battery health during bidirectional charging, including but not limited to bidirectional charging which is related to revenue generating and/or cost saving activities, such as in vehicle-to-grid, vehicle-to-building, and related activities. The disclosed embodiments include an apparatus, system, and/or method that uses temperature data to protect battery health during bidirectional charging, including bidirectional charging that involves monetization activities. The apparatus, system, and/or method include receiving at a processor temperature data, which includes the temperature data comprising at least the temperature of an electric vehicle battery or information required to determine the temperature of the electric vehicle battery; determining anticipated energy needs of a building relative to ambient air temperature; determining an amount of discharge of the electric vehicle battery required to offset the anticipated needs of the building by a predetermined amount; determining based on the temperature data whether discharging the electric vehicle battery by the predetermined amount will be harmful to the health of the electric vehicle battery; and discharging the electric vehicle battery to offset the anticipated needs of the building if it is determined that discharging the electric vehicle battery by the predetermined amount will not be harmful to the health of the electric vehicle battery.

BRIEF DESCRIPTION OF THE DRAWINGS

In the aforementioned figures, like reference numerals refer to like parts, components, structures, and/or processes.

DETAILED DESCRIPTION OF THE INVENTION

Figure 1:
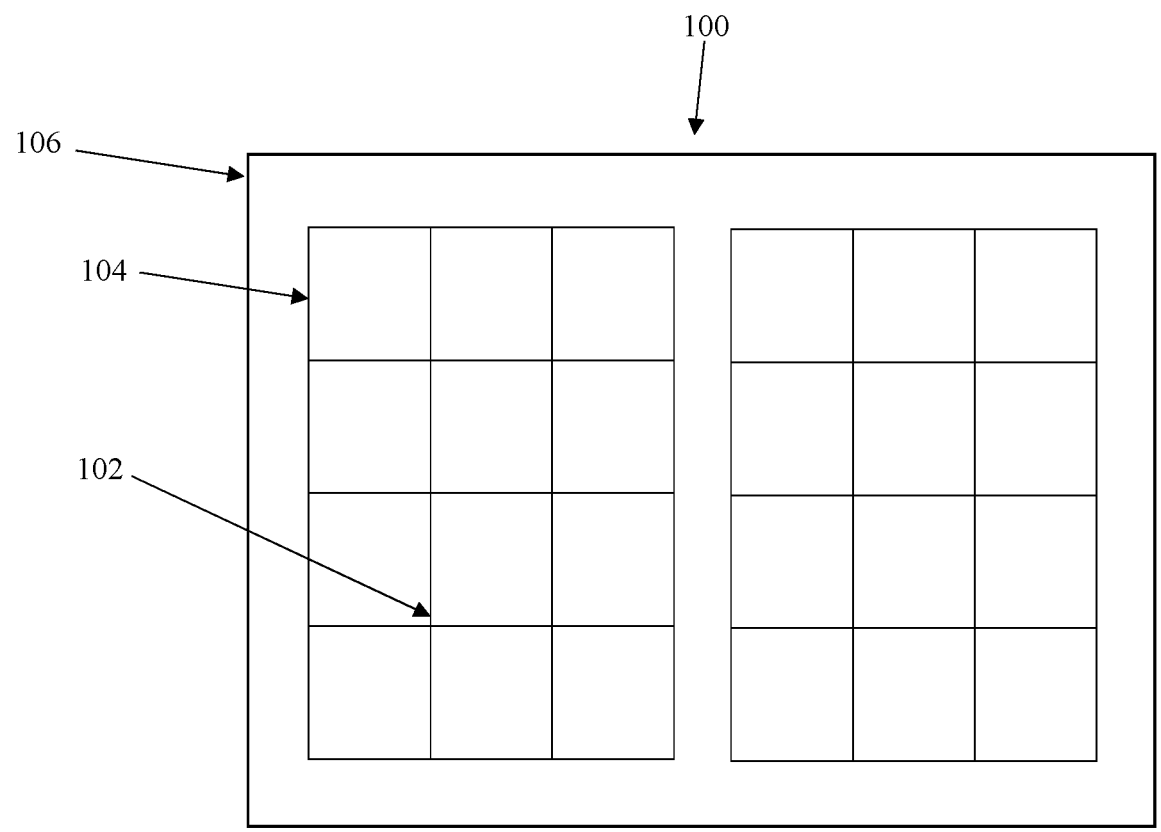
FIG. 1 is an electric vehicle battery according to an embodiment of the present invention.

As will be understood by those of ordinary skill in the art, aspects of the present disclosure may be illustrated and described herein in any of a number of patentable classes or contexts, including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or by combining software and hardware implementations that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, radio frequency (RF), etc. or any suitable combination thereof.

Computer program code for carrying out operations for aspects of the present disclosure may be written in any combination of one or more programming languages, such as any of the programming languages listed at https://githut.info/ (e.g., JAVASCRIPT, JAVA, PYTHON, CSS, PHP, RUBY, C++, C, SHELL, C #, OBJECTIVE C, etc.) or other programming languages. The program code may be executed by a processor or programmed into a programmable logic device. The program code may be executed as a stand-alone software package. The program code may be executed entirely on an embedded computing device or partly on an embedded computing device (e.g., partly on a server and partly on a personal computer and partly on an embedded device). The program code may be executed on a client, on a server, partly on a client and partly on a server, or entirely on a server or other remote computing device. The program code also may be executed on a plurality of a combination of any of the foregoing, including a cluster of personal computers or servers. The server or remote computing device may be connected to the client (e.g., a user's computer) through any type of network, including a local area network (LAN), a wide area network (WAN), or a cellular network. The connection also may be made to an external computer or server (e.g., through the Internet using an Internet Service Provider) in a cloud computing environment or offered as a service such as a Software as a Service (SaaS).

The electric vehicle in which the present disclosure may be implemented may be any vehicle with a battery that may be utilized as an energy storage asset, including an electric truck, electric bus, electric car, electric forklift, electric motorcycle, electric scooter, electric wheelchair, electric bicycle, etc. While such batteries are typically found in these types of exemplary vehicles, they also may be found in other mobile energy storage assets. The present disclosure is directed to maintaining battery health during bidirectional charging activities, including revenue generating and/or cost saving activities, so that the batteries remain in optimal condition to power the electric vehicles when not being used for such bidirectional charging activities, including revenue generating and/or cost saving activities.

Aspects of the present disclosure are described herein with reference to flowchart illustrations and/or block diagrams of methods, apparatuses (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. Those computer program instructions may be provided to a processor of a general-purpose computer, special purpose computer, or other programmable data processing apparatus to produce a machine, such that the instructions, which are executed via the processor of the computer or other programmable instruction execution apparatus, create a mechanism for implementing the functions/acts specified in the flowchart and/or block diagram block or blocks.

Those computer program instructions may also be stored in a computer-readable medium that, when executed, can direct a computer, other programmable data processing apparatus, or other devices to function in a particular manner, such that the instructions, when stored in the computer-readable medium, produce an article of manufacture that includes instructions which, when executed, cause a computer to implement the function/act specified in the flowchart and/or block diagram block or blocks. The computer program instructions also may be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

The disclosed embodiments use temperature data to provide various advantages over the prior art. Such temperature data includes the temperature of electric vehicle batteries, ambient air temperature, and/or anticipated energy needs of a building relative to ambient air temperature. The disclosed embodiments use this data to ensure battery health whenever electricity is discharged from the electric vehicle batteries, particularly during revenue generating and/or cost saving activities.

For example, a vehicle-to-building operator may analyze historic electricity load or historic temperature data for a particular building site. Using that historic data, the operator may identify past building load peak events and determine when peak events are likely to occur at the building in the future (i.e., predict or anticipate future energy needs for the building). The operator may then ensure that at least one electric vehicle is available at the building site during the anticipated or predicted peak event. Electricity from the batteries of the at least one electric vehicle may then be discharged into the building during the duration of the anticipated or predicted peak load event to off-set the building's load. This may be implemented as a cost-saving activity by preventing peak demand charges from being assessed during the peak load event at the building site.

During this bidirectional charging, the disclosed embodiments may prevent the battery(s) of the at least one electric vehicle from being discharged below a threshold level to protect the long-term health (i.e., prevent degradation) of the at least one electric vehicle battery(s). Temperature may be a factor in making this determination, particularly when determining whether to discharge the electric vehicle batteries to offset a peak load event. But the disclosed embodiments also may allow the electric vehicle batteries to be discharged to offset a peak load event despite the potential to degrade the batteries. This may occur, for example, if it is determined that the money that discharging the electric vehicle batteries can earn (i.e., save by preventing assessment of a peak demand charge) outweighs the potential cost of battery degradation. The disclosed embodiments also may leave this decision to the system operator, in which case the disclosed embodiments may be configured to present this information to the system operator so that person may make an informed decision in this regard.

The disclosed embodiments may be implemented in any "X" number of applications, such as vehicle-to-grid applications, vehicle-to-building applications, vehicle-to-home applications, vehicle-to-vehicle applications, etc. (i.e., vehicle-to-X applications, or "V2X"). The differences in each such "X" application are primarily the system with which the electric vehicle is integrated. For example, the disclosed embodiments may be used to integrate electric vehicles with the electric grid (i.e., vehicle-to-grid) or they may be used to integrate electric vehicles with a building's electric load in a behind-the-meter system (i.e., vehicle-to-building). A behind-the-meter system is a system comprised of the electrical system that is metered by a utility, such as the electrical system in a commercial building or a private home. The grid may be a larger system that includes everything between a plug and the utility. It should therefore be understood that vehicle-to-building applications, vehicle-to-home applications, vehicle-to-vehicle applications, etc. may be part of, or even referred to as, vehicle-to-grid applications.

The disclosed V2X system enables the battery or batteries in an electric vehicle or vehicles to provide energy storage services when the battery of the vehicle is not being used, such as when the vehicle is stationary and/or turned off. In the V2X system, stored energy in the electric vehicle batteries may provide valuable services to virtually anyone in need of additional electricity (e.g., grid operators, utilities, building owners, homeowners, etc.). The electricity from the electric vehicle batteries may be used, for example, to reduce electricity costs and strengthen operational resiliency by reducing the load on other sources of electricity (e.g., the grid, solar panels, stationary batteries, etc.). The V2X system may engage an electric vehicle's batteries in multiple activities or market applications of V2X to generate revenue or conserve resources in addition to bidirectional charging.

Figure 4:
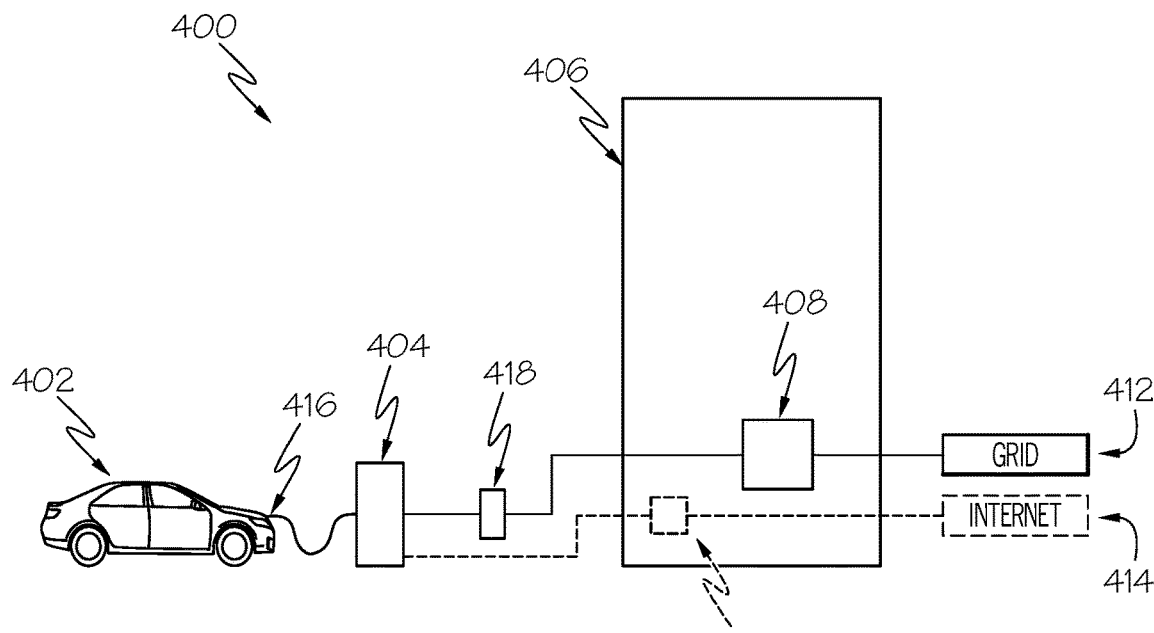
FIG. 4 is a system for vehicle-to-grid operations according to an embodiment of the present invention.
Figure 5:
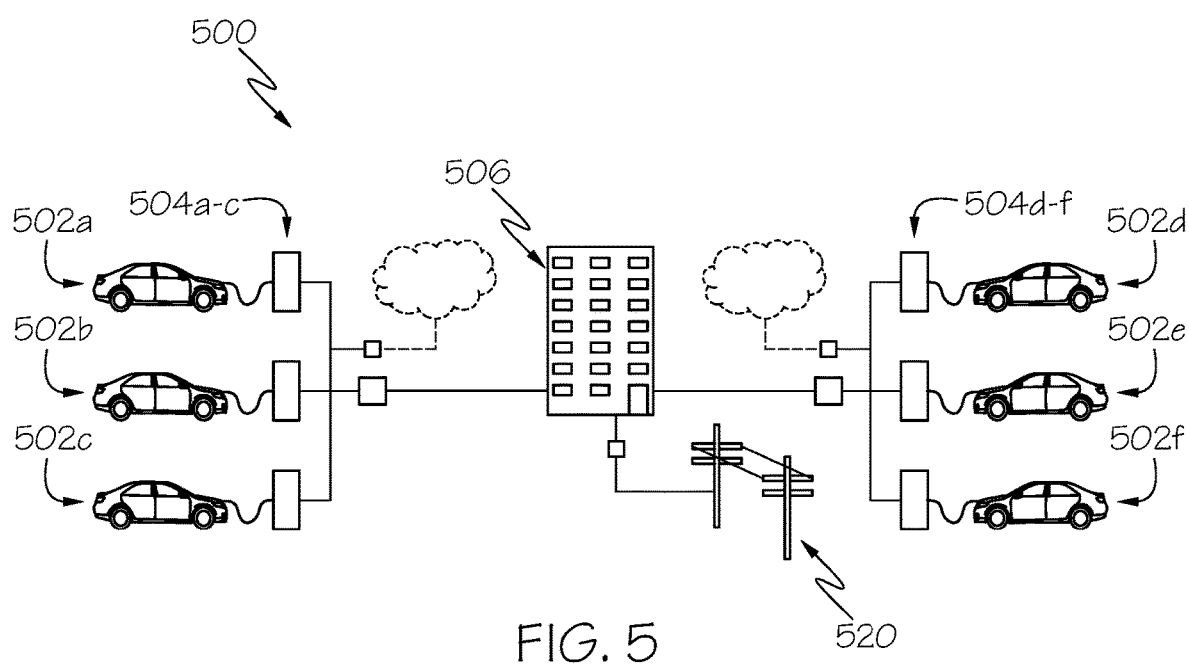
FIG. 5 is a system for vehicle-to-grid operations according to an embodiment of the present invention.

The disclosed V2X system, such as example system 400 as depicted in FIG. 4 or example system 500 as depicted in FIG. 5, uses software and a bi-directional charger to enable interactions between the electric car, charger, and any other resource the system is going to be used with the electric vehicle batteries to monetize it (e.g., a building, the electric grid, or utility provider). The V2X system may use weather data, including temperature and humidity, to make strategic decisions and control these interactions. This weather data may be historic, forecast, real-time, or any combination thereof. The V2X system also may use historic, forecast, and/or real-time building load data (e.g., for an electric vehicle battery, for a building, etc.) to make such decisions. Examples include using such data to preserve battery health and to predict future peak events to ensure an electric vehicle is available to use in revenue generating or conserving activities.

The V2X system is configured to optimize the health and lifespan of electric vehicle batteries. Accordingly, the V2X system is configured to prevent electric vehicle batteries from being worn down by non-logistics duty cycle activities. One non-limiting factor in preserving battery health is to protect the battery from overheating. Ambient air temperature is one contributing factor to battery temperature and can often be mitigated by a cooling system in the electric vehicle. Vehicle use, and therefore battery use, is another contributing factor, as such use may increase the temperature of the battery and/or effect the charge remaining on the battery. Other factors related to V2X operations that impact battery temperature, and therefore battery health, include but are not limited to throughput (i.e., the volume of electricity going through the battery during charging or discharging), building load, timing of past and anticipated vehicle logistics utilization, and availability of other energy storage assets.

The V2X operator may not always own the electric vehicle being used. Although the V2X operator may not own the electric vehicle batteries or cooling system, the V2X operator may need to anticipate when there may be issues or faults with the electric vehicle's battery management system ("BMS") so that the V2X operator does not lose access to using the electric vehicle batteries' charge in their operations. It also may be important to a vehicle owner that the V2X operator take appropriate steps to monitor battery temperature, ambient air temperature, and/or other temperature data points to ensure battery longevity and ensure the willingness of the vehicle owner to allow for V2X activities. For example, this may be necessary to prevent the vehicle owner from voiding any warranty the vehicle manufacturer may have placed on the vehicle and/or its battery.

Engaging in V2X operations requires an electric vehicle that is configured for bi-directional charging (e.g., a NISSAN brand Leaf electric vehicle), a bi-directional power conversion device at the charging site (e.g., a FERMATA ENERGY brand bi-directional charger), and a software system that enables interoperability between the electric vehicle, charger, power grid, and any other energy assets (e.g., solar, wind, stationary battery, etc.) and is capable of managing and optimizing vehicle-to-grid technology. Any vehicle powered by a battery is capable of V2X operations if it is configured for bi-directional power conversion. A key component of the charger is a bi-directional power conversion structure, or power stage, comprising interconnect devices and power conversion equipment that is configured to charge the vehicle batteries from the grid or discharge the vehicle batteries' stored energy back into the grid or building. This type of bidirectional charging may be provided by locating the charger onboard the electric vehicle itself or locating the charger outside the vehicle as an offboard option that is compatible with existing electric vehicles. The software has several functions, including receiving information from vehicles (e.g., state of charge, battery voltage, maximum charge and discharge current levels, vehicle status, etc.), sending vehicles charge/discharge instructions (e.g., power level, start/stop commands, charger status, etc.), and receiving inputs of various data elements (e.g., current building load kW demand, building load kW demand target not to exceed, weather data (e.g., temperature and humidity), grid market factors, etc.).

Battery Health

Many factors can contribute to maintaining, optimizing, or harming electric vehicle battery health. One example is the cycle life of the battery as cycling energy through a battery causes different degrees of capacity loss depending on various factors, including but not limited to rate of charge/discharge relative to maximum energy capacity ("c-rate"), depth of discharge ("DoD") that battery is cycled to (e.g., 50% DoD means the battery is charged or drained to half its capacity), total energy throughput cycled in and out of the battery, and the temperature at which cycling occurs. Factors such as DoD, throughput, and temperature may contribute to degradation of battery health.

The effect of temperature on battery health may depend on the electrochemical makeup of the battery (e.g., Lead-Acid, Nickel Cadmium (NiCd), Nickel Metal Hydride (NiMH), Lithium-Ion (Li-Ion), etc.). Such batteries may achieve a maximum service life if charged and discharged at particular temperatures. For example, lead-acid batteries have permissible charging temperature range of −4° F. to 122° F. and a permissible discharging temperature range of −4° F. to 122° F., NiCd and NiMH batteries have permissible charging temperature range of 32° F. to 113° F. and a permissible discharging temperature range of −4° F. to 149° F., and Li-Ion batteries have permissible charging temperature range of 32° F. to 122° F. and a permissible discharging temperature range of −4° F. to 140° F. Such batteries may provide better charging performance at cooler temperatures and may even allow for fast-charging toward the lower end of these discharging temperature ranges. Thus, the disclosed V2X system accounts for these temperature effects when determining whether and when to charge or discharge an electric vehicle battery.

Another factor considered by the disclosed V2X system is battery calendar life loss, which occurs whether the battery is active or not and is primarily affected by the ambient air temperature and average state of charge experienced throughout the battery's life. For example, regarding the state of charge of the battery, it is optimal for battery health to keep the state of charge between 30-70% as much as possible. Ambient air temperature also effects battery health but can be mitigated. By tracking ambient air temperature relative to battery health, the V2X system determines if mitigation actions are needed, such as lowering kW power commands.

Other factors also may affect battery health, such as whether the electric vehicle was just driven, how long it was driven for (time and/or mileage), whether the car just charged or discharged, or how aggressively or gently the electric vehicle was driven. The V2X system may use these types of information to make decisions about scheduling V2X operations and assignment of a vehicle to revenue generating and/or cost savings activities because different uses of the battery impact the battery differently.

There may be a temperature sensor, such as a thermistor, attached to the electric vehicle batteries that detects the temperature of the battery. Tracking or knowledge of battery temperature and other vehicle activities, such as those described above, may also be independent of the charger (e.g., performed by the electric vehicle), in the charger, or some combination thereof (e.g., measured and communicated by the vehicle and logged and tracked by the charger). As depicted in FIG. 1, temperature metrics may be tracked on various scales of the battery 100, such as at the cell level 102, module level 104, and/or pack level 106. Electric vehicle manufacturers may have configured their vehicles to generate such battery temperature data and preferably allow that data to be shared with the V2X system. Alternately, the V2X system may be configured to measure this data using sensors that may be added to the electric vehicle or placed proximate to the electric vehicle. The V2X system then uses the temperature data to identify, control, and/or facilitate V2X revenue generating and/or cost saving activities in a manner that optimizes the health, life, and/or useful capacity of the electric vehicle batteries, such as described above.

Figure 2:
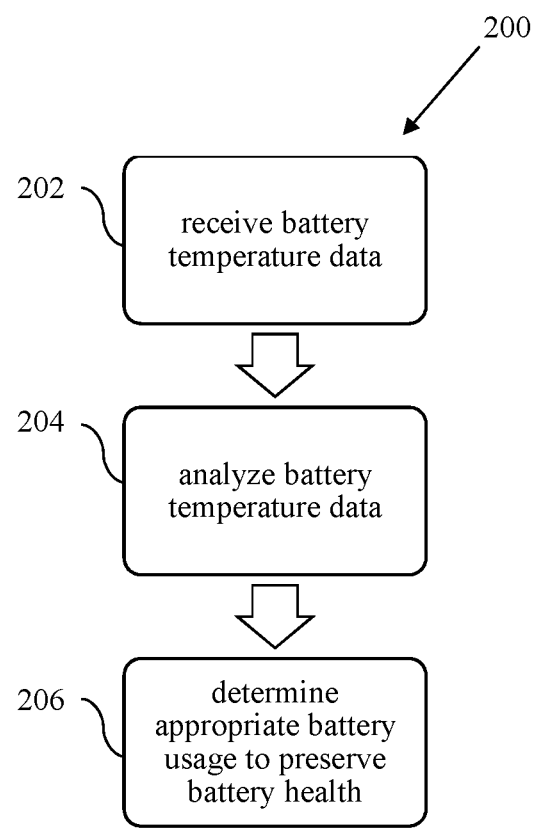
FIG. 2 is a flow chart according to an embodiment of the present invention.

In the exemplary method 200 of FIG. 2, the V2X system receives battery temperature data regarding one or more electric vehicle batteries at step 202. This temperature data may be obtained directly from the electric vehicle(s). The data may alternately be obtained indirectly from the electric vehicle manufacturer where, for example, the electric vehicle manufacturer configures the electric vehicle to keep the data proprietary and/or encrypted so that the vehicle manufacturer is able to control dissemination of that data. In this instance, the electric vehicle manufacturer may receive this data wirelessly, or via a network connection established through a charger. The electric vehicle manufacturer would then log and store the data and share it with the V2X system at step 202.

At step 204, the V2X system may then analyze the data to determine the current temperature, trend of the temperature, weather forecasts, or any other suitable or related metric. The V2X system may then determine appropriate usage of the battery while preserving battery health at step 206. For example, the V2X system may determine that it is not going to let the particular electric vehicle discharge at 25 kW to preserve battery health based on temperature data of the battery received at step 202 that reflects a high temperature.

If the V2X system does not have access to real-time temperature data from a sensor attached to or proximate to the electric vehicle battery, the V2X system may use other inputs to predict or estimate the battery temperature, including but not limited to third party weather prediction data or on-site measured temperature data. The V2X operator may then control charge, discharge, or other use of the electric vehicle battery to protect the health, life, and/or useful capacity of the battery based on the predicted or estimated battery temperature.

Figure 3:
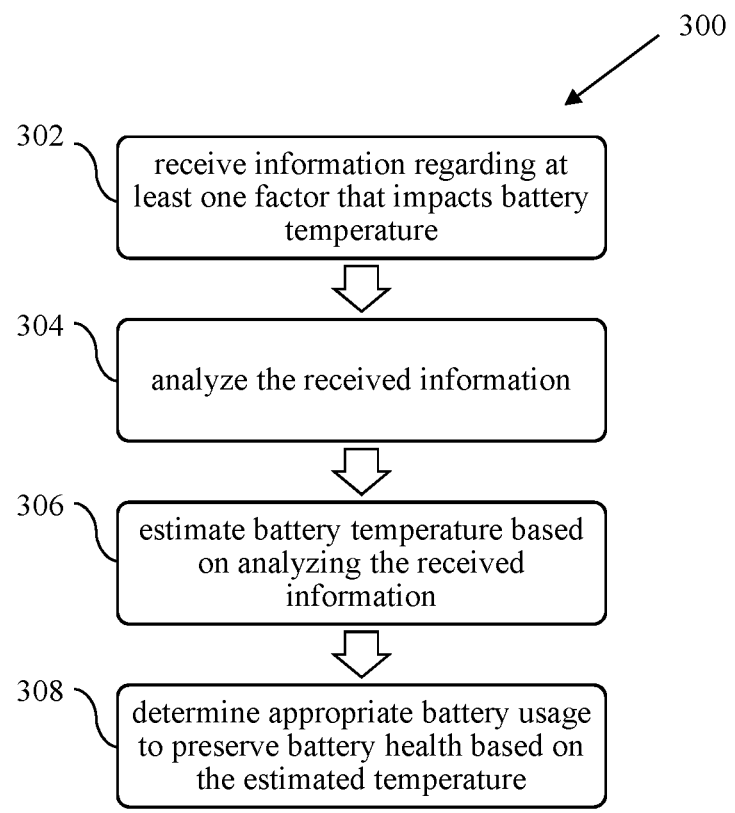
FIG. 3 is a flow chart according to an embodiment of the present invention.

In the exemplary method 300 of predicting or estimating temperature of the electric vehicle battery depicted in FIG. 3, the V2X system receives one or more input data at step 302 regarding at least one of the factors that impact battery temperature, as discussed above. For example, the V2X system may receive information or data indicating that the electric vehicle had just been charged a significant amount (e.g., charged from 30% to 100%). The V2X system may receive information or data that there currently is a high ambient air temperature (e.g., 104° F.). The V2X system may receive information or data about ambient air temperature for the area where the vehicle is located, such as a building site, through data from a third-party service, such as a weather service, or from a temperature sensor or other suitable device for measuring the ambient air temperature. Such an ambient air temperature sensor may be installed, for example, at the charger, on the building, or any other suitable location near the electric vehicle. The V2X system also may receive information regarding other factors that impact battery temperature communicated to operations management software from the electric vehicle's BMS, from observing and tracking the electric vehicle's activities, sensors or other suitable technology operated by the V2X system, or from a third-party source.

The V2X system may analyze the received information at step 304 and estimate or predict the battery temperature or temperature range based on that analysis at step 306. The V2X system also may use any other suitable inputs (e.g., humidity), alone or in combination with each other, to estimate or predict the battery temperature or temperature range at step 306. Optionally, steps 304 and 306 may be skipped if the electric vehicle's BMS provides the battery temperature at step 302.

The V2X system may log and track this temperature data for use in predicting battery temperature. For example, battery temperature may be determined at step 306 at a particular day and time, and the weather (e.g., temperature, humidity, etc.) for that same day and time for the same location as the battery may also be recorded. The recent usage of the vehicle also may be recorded at that date and time. The V2X system then may use this recorded data as historical data for making vehicle-specific (i.e., battery-specific) predictions of battery temperature, such as predicting that a particular vehicle will have a particular temperature on a date and time that is predicted to have a temperature in which high battery temperatures have been observed.

From the foregoing inputs (or other suitable inputs), the V2X system may determine that the temperature of the battery is likely to be too hot for charging and/or discharging. For example, it may be determined that a NiMH battery is too hot for charging if its temperature is determined to be greater than 113° F. and it may be determined that a NiMH battery is too hot for discharging if its temperature is determined to be greater than 149° F. It should be understood, however, that these temperatures may be different for different types of batteries, these temperatures may be selected by vehicle and/or battery manufactures, and these temperatures may be set lower than any set maximum to provide an additional degree of safety.

The V2X system will determine at step 308 whether and how to use the electric vehicle's battery while protecting the battery and preserving its health based on the estimated or determined battery temperature from step 306 (or alternately from data provided by the vehicle's BMS). Based on the determination that the vehicle's battery temperature is too hot for charging and/or discharging, the V2X system may prevent charging and/or discharging of the battery. For example, the V2X system may determine not to discharge that electric vehicle's battery or to discharge the battery at a lower rate based on the temperature of the battery. If the V2X determines not to discharge that electric vehicle's battery, it may send a message to the vehicle user via the charger, instructing the user to plug into a different charger so the present charger may remain open for a vehicle that has a battery that can be discharged. This is most likely to occur, for example, near a predicted peak load event so that the V2X system can ensure that the vehicles connected to the system are available for discharge and offsetting building load during the entirety of said peak load event.

If the V2X determines to discharge an electric vehicle's battery at a lower rate, the system may need to discharge the batteries from a larger number vehicles to offset enough load to prevent a peak load event. For example, rather than determining not to discharge a battery at 25 kW based on battery temperature, the V2X system may determine to let the electric vehicle discharge its battery at something below 25 kW (e.g., 13.5 kW) if such discharge is safer and other vehicles that can discharge at 25 kW are not available. In such an instance, the V2X system then may determine that two vehicles, rather than one, are needed to offset enough load to prevent a peak load event.

The V2X system also may determine to limit charging and/or discharging activity to lower kW power levels based on ambient temperature. For example, an electric vehicle may be driven in the morning and then connected to the charger in the afternoon. The V2X system may determine that, because the air temperature is quite high when the electric vehicle is connected to the charger in the afternoon and because the electric vehicle was just driven, the vehicle battery is likely to be relatively hot. To preserve battery health, charging and discharging would be limited as much as possible and would be done only if needed, and only at a low power level. If such limits are not sufficient to support the desired revenue generating and/or cost saving activities, the V2X system can rely on another electric vehicle (e.g., one that was not driven recently and/or that has a cooler battery temperature) for these activities, alone or in combination with the vehicle that was just driven.

Monetization Activities

The disclosed V2X system may engage electric vehicle batteries in bidirectional charging along with activities, such as monetization activities to generate revenue or save costs. The V2X system includes an operations management component that is configured to analyze factors relating to the electric vehicle and its battery, such as state of charge, anticipated near-term energy requirements for the vehicle, near-term monetization opportunities (e.g., demand charge management, grid ancillary services, etc.), and any other relevant factors, to then determine the optimal monetization use for the battery at that time. The operations management component may then communicate the dispatch instructions to one or more electric vehicles and/or one or more chargers.

Fleet vehicles, such as a fleet of electric vehicles for a municipality, may be particularly suited for these types of opportunities, but any suitable electric vehicle may be used for monetization opportunities. Fleet vehicles may be particularly suited because they remain parked and unused most of the time, have predictable and managed schedules, and are generally located near larger grid infrastructure and sources of large load.

Any suitable number of electric vehicles and chargers may be used for monetization opportunities. Aggregation of vehicles and chargers may provide opportunities to maximize revenue generation and/or cost savings. These monetization activities may vary and, in particular, may vary depending on the user.

The V2X system may be integrated or otherwise communicate with the systems of regional transmission organizations (RTO), independent system operators (ISO), utilities, or retailer meter customers. Examples of energy services to RTOs or ISOs include, but are not limited to, frequency regulation, demand charge management, spin/non-spin reserves, voltage support, black start, and capacity. Examples of energy services to utilities include, but are not limited to, energy arbitrage, resource adequacy, distribution deferral, transmission congestion relief, and transmission deferral. And examples of energy services to utility retail customers include, but are not limited to, time-of-use bill management, demand charge reduction, backup power/resilience (particularly for disaster recovery). The V2X system may be configured to provide and/or facilitate any one or more of these services.

Many variables impact charge and discharge cycles of electric vehicle batteries, including the number of miles driven per vehicle per year, size of building or other load, building or other load characteristics (e.g., flat vs. peaky, duration of peak, predictability of peaks, etc.), vehicle battery size (e.g., 60 kWh vs. 30 kWh), temperature and humidity profile for location of electric vehicles and chargers, minimum battery state of charge, maximum throughput, site electricity tariff schedule, distribution grid peaks, transmission grid peaks and congestion, and times of high kWh pricing. For example, the disclosed embodiments use size of building load, load characteristics (e.g., flat vs. peaky, duration of peak, predictability of peaks, etc.), and temperature and humidity profile for location of vehicles and chargers to maximize revenue generation.

In addition, many variables may shape the load profile of a building and each building site may be unique and, therefore, may be analyzed individually to determine the optimal revenue generating activity or activities for that building site. The building site may include the building structure, the plot of land on which the building is situated, the property associated with the building's physical address, or even the zip code in which the building is located, depending on the variable being considered. For example, the building site may include the building's zip code if the variable being considered is weather, and the building site may include the building's electrical system behind the meter if the variable being considered is historic building load data. Examples of factors that influence how much and at what rate a building uses energy include, but are not limited to, building size, building age, equipment (e.g., cooling, heating, lighting, and other systems), usage and program (e.g., office, hospital, 24/7 operations, server farm, etc.), climate, number of windows, automated building controls, and any service by separate energy plants or chillers.

To leverage monetization pathways, the V2X system is configured to access various data, whether it be real-time data from a sensor, data from the electric vehicle manufacturer, stored data, or data from a third-party source (e.g., sources of historic or forecasted data, such as the National Oceanic and Atmospheric Administration (NOAA)). To engage in vehicle-to-grid or building activities, a bi-directional charger is provided that is capable of injecting power into an electric grid or into a building's electrical system while the building remains connected to and using power from the grid (i.e., the charger is integrated with a "grid-tie inverter"). Common roof-top solar installations use this type of "grid-tie inverter" to partially power a home or building without disconnecting certain loads or the home from the grid. To effectively optimize monetization opportunities, the V2X system includes software with several communication functions, including requesting and receiving state of charge data from an electric vehicle, sending charge/discharge instructions to a charger and/or electric vehicle, and coordinating multiple electric vehicles to offer their capacity as a single resource (aggregation). The software also may be configured to receive and analyze inputs of various data elements, such as logistics duty cycle requirements and schedules, building load patterns, weather data (temperature and humidity), and grid market factors to effectively optimize monetization opportunities.

In the exemplary embodiment of FIG. 4, a V2X system 400 for engaging in revenue generating and/or cost saving activities is depicted. The system 400 may include an electric vehicle 402 connected to a bi-directional charger 404 through a quick-change port 416 or other suitable connection mechanism. A disconnect 418 may exist between the charger 404 and building 406. The building 406 has a building electrical panel 408 or other suitable connection mechanism to connect to the grid 412 and a local ethernet port 410 or other suitable connection mechanism to connect to the Internet 414.

In the exemplary embodiment of FIG. 5, a V2X system 500 for engaging in revenue generating and/or cost saving activities is depicted. The system 500 may include a fleet of electric vehicles 502a-c. Each electric vehicle 502a-c may be connected to a bi-directional charger 504a-f. The bi-directional chargers 504a-f may be connected to building 506 behind the building's utility meter 520. Each vehicle 502a-f connects to the building 506 in a similar manner using the components depicted in FIG. 4. Although the exemplary embodiment of FIG. 5 is depicted with six (6) electric vehicles, any suitable number of vehicles may be used depending on the needs of the particular building and/or availability of and number of electric vehicles able to be scheduled.

In one exemplary embodiment, the V2X system 400 or 500 is configured to monetize electric vehicles in the frequency regulation market. The frequency regulation market allows grid operators to fine tune the flow of electricity in the grid by quickly adding or shedding small amounts of power every few seconds. Frequency regulation is the immediate response of power to a change in a locally sensed system frequency. Regulation is needed to ensure that system-wide generation is matched with system-level load on a moment-by-moment basis in order to avoid system-level frequency spikes or dips that can cause grid instability. In this example, the electric grid may give a signal to the vehicle 402, 502a-f every two (2) seconds while the electric vehicle 402, 502a-f was parked and engaged in the frequency regulation market for twenty-four (24) hours. While the charging event would only be two (2) seconds at a time, each charging event represents some amount of throughput that, in the aggregate over the course of twenty-four (24) hours, may be significant. This aggregate throughput effect may cause heating of the battery of electric vehicle 402, 502a-f and throughput under certain conditions may create a heat problem for the battery. It should be understood, however, that this is only one example and different use cases may have different impacts on the battery.

Another exemplary embodiment for monetization is demand charge management. Demand charges may account for over a third of a building's electricity expenses and are based on the highest rate of electricity consumption (i.e., power or kW load) for a building. Demand charges are based on the highest observed rate of electricity use (i.e., load) that a building experienced in a month. A utility typically determines the monthly electric load peaks by calculating the highest average load over a 15-30 minute time period and bills this by multiplying the average kW amount by a demand charge price ($/kW). This demand charge price may range from several dollars to $30+ per kilowatt depending on the location. Thus, peak load events may trigger large costs to the building operator on their electric bill.

Reducing the kW load during the 15-30 minute peak load period may reduce the demand charge and the corresponding monthly power bill by a significant amount. If an electric vehicle 402, 502a-f is discharged to partially power a building 406, 506 during the peak demand charge period, the demand charges may effectively be reduced. This is because the utility demand meter will register a corresponding reduction in the building 406, 506's load as metered electricity that would normally be drawn from the grid 412, 520 because the metered electricity is being replaced by electricity from the electric vehicle which, is not metered, i.e., this is an example of behind-the-meter monetization activity.

To effectively achieve monetary savings through demand charge management, the V2X system 400, 500 is configured to accurately forecast building loads in order to ensure one or more electric vehicles are available to discharge into the grid during an anticipated peak load event. Accurate forecasting includes consideration and evaluation of a variety of factors, including but not limited to local demand charge tariffs; site load profiles on an hourly, daily, and weekly basis; site load predictability; site logistics schedule; site duty cycle flexibility and predictability; and number of electric vehicles (e.g., the size of municipality's fleet of electric vehicles) to charger ratio. If the result of this forecasting determines that demand charge management is viable, commands may be sent from the V2X system 400, 500 to carry out the service.

These commands may be sent from a centralized location that manages the electric vehicles 402, 502a-f and chargers

404, 504a-f, or it may originate from a local charger system at the specific site. Further, this load forecasting may be integrated into weekly and/or daily fleet schedules to account for demand charge management time requests and reservations. The V2X system 400, 500 utilizes anticipated energy needs of the building to determine how much energy to make available, such as by determining whether to charge a vehicle or allow it to be disconnected from a charger and driven. In the example of a fleet of vehicles, the V2X system 400, 500 may give the fleet manager the option to decide whether a vehicle should be charged or allowed to be unplugged and driven, rather than making this determination automatically. This option may be provided where, for example, the fleet manager would like to exercise control of this decision.

The V2X system 400, 500 may determine whether implement demand charge management by comparing the relative amount of energy storage capacity in terms of the systems maximum kW and kWh, total kWh throughput, and when and for how much time electric vehicles 402, 502a-f will need to spend discharging electricity to produce a certain amount of demand charge savings to reduce monthly and/or annual building load peaks. For example, if a building 406, 506's historic load profile suggests that peaks of similar magnitude and kW happen every day, then that building 406, 506 may require an electric vehicle 402, 502a-f to be parked and available more often because it will need to be used to discharge a significant amount of kWh on a regular basis. This may mean that the diminished availability of the vehicle 402, 502a-f for logistics activities cost and the additional cost in battery degradation attributable to the throughput on the battery, together or separately, may be too much relative to the monetary value of demand charge management activity. In this instance, the V2X system 400, 500 may determine not to perform the discharging of the battery, or it may allow the fleet manager to make that determination.

Another exemplary application of the disclosed V2X system 400, 500 is utility peak shaving, including both capacity and transmission shaving. This is based on system-wide peak load and involves managing transmissions and capacity charges for utilities by discharging electric vehicles 402, 502a-f during system-wide coincident peaks. For example, if the system-wide peak was 1,500 MW at 3 pm on July 1, and a single utility's peak load at that same time was only 150 MW, the system owner would be billed per kW for its coincident peak. Capacity charges are based on a single annual peak load of the generation system. Transmission charges are based on a monthly transmission system peak load. The discharge may typically be about two (2) hours, two (2) to three (3) times a month, with a potential for more discharge instances during the summer. This typically involves discharging five (5) or six (6) times during the summer months, but could be monthly, depending on the tariff for the particular location.

In each of the foregoing applications, the V2X system 400, 500 may use historic and forecasted temperature data to anticipate a building 406, 506's energy needs, including major peaking events for the building 406, 506's electric load. An electric vehicle 402, 502a-f plugged into a charging station 404, 504a-f at the building 406, 506 may discharge into the building 406, 506's load. And the V2X system 400, 500 may use historic or forecasted temperature data to predict or anticipate when a major peaking event will occur and ensure an electric vehicle 402, 502a-f is available for discharge at the building 406, 506 during that time.

The V2X system 400, 500 also may use historic load data for the building to identify load patterns and past peak events and predict or anticipate a building 406, 506's energy needs based on that analysis. The V2X system 400, 500 ensures that an electric vehicle 402, 502a-f is available during the building 406, 506's peak energy needs by dispatching a vehicle 402, 502a-f from a fleet or issuing a command or other instructions using the operations management component to keep vehicles 402, 502a-f charging or indicate that the vehicles 402, 502a-f are allowed to be checked out. Thereby, the V2X system 400, 500 may control the discharge of the electric vehicle batteries to optimize the health and life of the batteries and the useful capacity of the batteries while also offsetting the peak load to the building 406, 506. When discharging electric vehicles 402, 502a-f into the building 406, 506 during a time for anticipated energy needs/peak events, the V2X system 400, 500 may leave a threshold level of charge in each electric vehicle 402, 502a-f (e.g., it will not allow a vehicle to discharge below 30%) in order to avoid degrading the battery or otherwise negatively affecting its health.

A building 406, 506 load can be predicted based on historical load data, historical weather data, and/or other site data, such as building size, building age, equipment (e.g., cooling, heating, lighting, and other systems), usage and program (e.g., office, hospital, 24/7 operations, server farm, etc.), number of windows, automated building controls, and any service by separate energy plants or chillers. Thus, based on the predicted energy needs of the building 406, 506, the V2X system 400, 500 may determine whether to keep a vehicle or vehicles 402, 502a-f charging or allow them to be checked out. Alternatively, the V2X system 400, 500 may make recommendations to a fleet manager, including the identifications of associated risks to battery health relative to potential cost savings, so the fleet manager can make the ultimate decision. It should be understood that a fleet manager could make such decisions by providing inputs into the V2X system 400, 500, such as by typing commands with a keyboard or selecting them with a cursor.

Figure 6:
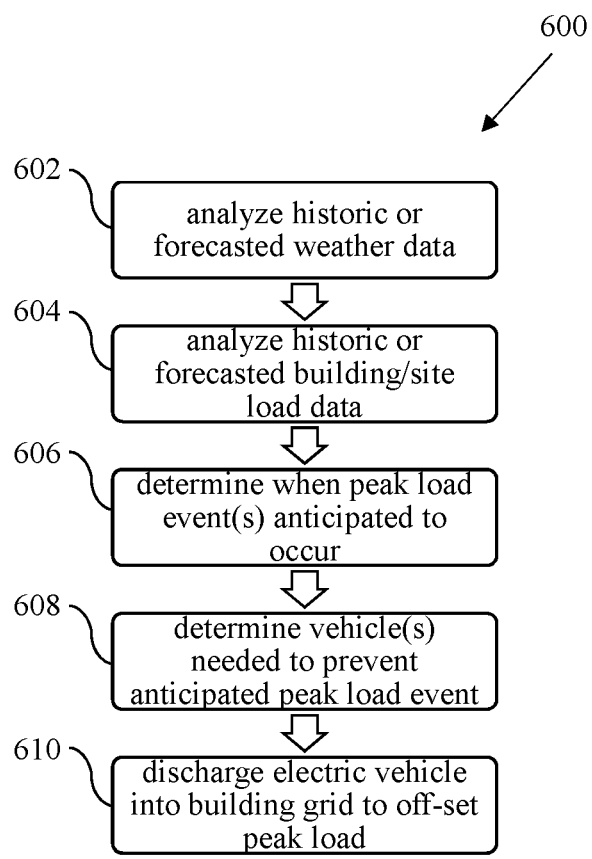
FIG. 6 is a flow chart according to an embodiment of the present invention.

FIG. 6 depicts the flow of an exemplary method 600 for monetization through demand charge management. At step 602, historic or forecasted weather data is analyzed by a V2X system, such as the V2X system 400, 500 described above, to identify patterns. The weather data may include temperature or humidity or any other suitable weather metric that may contribute to a peak electric load.

At step 604, historic or forecasted building or site load data is analyzed by the V2X system to identify peak load events. The peak load data may include actual loads measured at the meter, utility bills with identifiable peak load charges, or any other suitable data that may be used to correlate a peak load event to a particular day.

At step 606, a determination or prediction is made of when one or more peak load events are expected to occur based on the anticipated energy needs for a building, such as building 406, 506 described above. This determination may be made, for example, by correlating current or forecast ambient temperature and/or humidity data with historic peak load data. In this example, historic temperature and/or humidity data would be taken from days and times at which peak load events are identified in the historic peak load data. A peak load event can then be predicted to occur on days and times at which the same or similar temperature and/or humidity is occurring or expected to occur. Other metrics also may be considered instead or in addition to temperature and/or humidity, such as the number of people and/or employees occupying a building, the occurrence of certain events, etc. For example, if a peak load event is predicted to occur on a national holiday (e.g., July 4$^{th}$) because the temperature and humidity are expected to be at a certain level, the V2X system may determine that no peak load event will actually occur on that date because no employees will be in the building and any load will be minimal.

At step 608, the V2X system determines the number of electric vehicles, such as electric vehicles 402, 502*a-f* described above, that will be needed at the day and time of an anticipated peak load event to discharge enough electricity to offset the building load enough to prevent the anticipated peak load event. The V2X system then ensures that the determined number of electric vehicles is available at the building to discharge electricity at that particular date and time. The V2X system may do this through some mechanism, such as an automated lock, that prevents one or more vehicles from being disconnected from a charger, such as charger 404, 504*a-f* described above. The V2X system may do this by interfacing with the operations management software and preventing the software from allowing certain vehicles to be checked out for use. The V2X system may do this by sending a message to the fleet manager identifying particular electric vehicles, or combinations of electric vehicles, that should not be checked out for use. The V2X system also may do this by any other suitable method or mechanism.

At step 610, the electricity from the battery of the electric vehicle connected to the charger at the building is discharged into the building's electrical system behind the meter to offset the predicted peak load at the meter. Any suitable number of electric vehicles may be present at the building to discharge into the grid during the anticipated peak load event. This number may be predicted by the V2X system and a message sent to the fleet manager and/or fleet vehicle users ahead of the anticipated peak load event to ensure that enough vehicles are present at the time of the peak load event.

As a more specific example, historic temperature data for Las Vegas, Nev. may indicate that a building with an electric vehicle charger or charging station in Las Vegas may likely experience a peak electric load on July 2 from 1-1:30 pm due to extremely hot temperatures on that date and time historically. Accordingly, the V2X system will ensure that a particular number of electric vehicles are available at the building on July 2 from 1-1:30 pm. The V2X system also may identify which vehicle(s) should be made available based on battery health. The V2X system may identify particular vehicles as available or unavailable for this purpose via instructions dispatched by the operations management component. Although in certain embodiments the V2X system may be configured to disable certain vehicles for this purpose, in other embodiments the V2X system will inform the fleet manager which vehicles should be left connected to their chargers, so the fleet manager can prevent certain vehicles from being checked out during peak load events. In that way, the batteries of electric vehicles may be discharged into the building's electrical system behind the building's meter during times of predicted peak load, such as from 1-1:30 pm on July 2, to prevent the building from drawing extra electricity (and therefore extra charges) across the meter. This may be performed using components described above in FIGS. 4 & 5.

In another example, forecasted temperature data for Washington, D.C. may indicate that a building with an electric vehicle charger or charging station in Washington, D.C. may likely experience a peak electric load on January 24, because the forecast predicts a high of 70° F., significantly higher than the temperatures for any of the other days in January. The forecasted data may also indicate that the hottest portion of the day is estimated to be from 2:30-3 pm. Accordingly, the V2X system may ensure that an electric vehicle is available at the building for discharging electricity into the building's electrical system on January 24, from 2:30-3 pm. As discussed above, the vehicle may be made available for this purpose via instructions dispatched by the operations management component or by a fleet manager. The batteries of the electric vehicle may then be discharged into the building's electrical system behind the building's meter during times of predicted peak load, such as from 2:30-3 pm on January 24, to prevent the building from drawing extra electricity (and therefore extra charges) across the meter. This may be performed using components described above in FIGS. 4 & 5.

Figure 7:
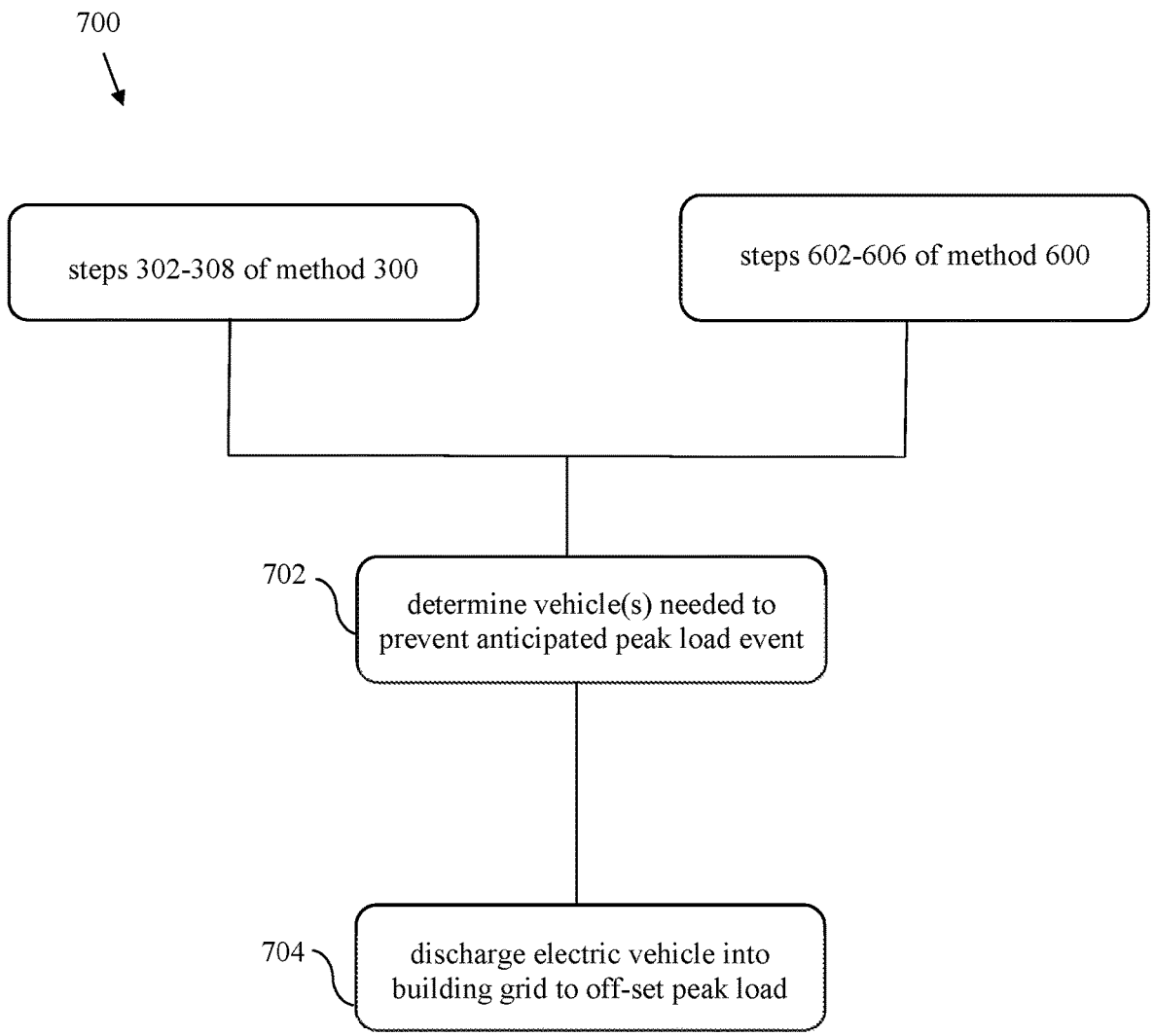
FIG. 7 is a flow chart according to an embodiment of the present invention.

FIG. 7 depicts the flow of an exemplary method 700 for predicting or estimating temperature of the electric vehicle battery and monetization through demand charge management. Method 700 may begin with either steps 302-308 of method 300 or steps 602-606 of method 600 as long as either step 308 or step 606 occurs before step 702. As discussed above, steps 302-306 lead to the appropriate battery usage being determined for preserving battery health at step 308, and steps 602-604 lead to the determination of anticipated peak load events at step 606.

At step 702, the V2X system determines the number of electric vehicles that will be needed at the day and time of an anticipated peak load event to discharge enough electricity to offset the building load enough to prevent the anticipated peak load event. The V2X system may be V2X system 400 or 500 and the electric vehicle(s) may be any of electric vehicles 402, 502*a-f* as described above. The V2X system makes this determination using both the appropriate battery usage determined at step 308 and the of anticipated peak load events determined at step 606. For example, the V2X system may determine at step 308 that certain electric vehicles may only be discharged below a certain level (e.g., below 25 kW) based on their battery temperature. The V2X system may also determine at step 606 that a peak load event of a certain magnitude is about to occur. Then at step 702, the V2X system may determine the number of vehicles that will be needed to offset enough of the peak building load to prevent the peak load event using the determinations from step 308 and step 606. In this instance, more electric vehicles than may otherwise be needed to provide the required amount of discharge because one or more of these electric vehicles may need to be discharged at a lower level.

Also, at step 702, it may be determined that only electric vehicles with a certain battery temperature may be connected to a charger because of the proximity to an anticipated peak load event. This charger may be any of chargers 404, 504*a-f* described above. In this instance, an electric vehicle user may be prevented from discharging or instructed not to discharge its electric vehicle so that the charger may be left available for an electric vehicle with an acceptable battery temperature.

Similarly, the V2X system may predict both battery temperature and peak load events. By logging and tracking battery temperature data at step 306, high battery temperatures may be predicted at step 308 and this information may be used together with peak load events being predicted at step 606. The V2X system them may determine at step 702 that during some anticipated peak load event, certain vehicles are expected to have high battery temperatures and will not be able to discharge at a certain level (e.g., 25 kW), if at all. The V2X system will then make its determination as to how many vehicles are needed to prevent the anticipated peak load event based on the predicted discharge levels.

Also, at step 702, the V2X system ensures that enough electric vehicles are available at the building at the day and time of the anticipated peak load event to discharge enough electricity to offset the building load enough to prevent the anticipated peak load even, as described above with respect to step 608.

At step 704, the electricity from the batteries of one or more electric vehicles connected to the charger at the building are discharged into the building's electrical system behind the meter to offset the predicted peak load at the meter. Any suitable number of electric vehicles may be present at the building to discharge into the grid during the anticipated peak load event, such as the six (6) electric vehicles 502a-f at building 506 depicted in the example embodiment of FIG. 5. This number may be predicted by the V2X system and a message sent to the fleet manager and/or fleet vehicle users ahead of the anticipated peak load event to ensure that enough vehicles are present at the time of the peak load event, as discussed above.

Conventional vehicle-to-grid systems do not provide the advantages of these disclosed embodiments. One such advantage is the ability to predict both battery temperatures and peak load events. Knowing when to expect high battery temperatures and, therefore, having a more accurate understanding of the load that can safely be handled by a particular battery, allows the disclosed V2X system to more accurately determine the number of vehicles that will be needed to prevent a peak load event. It also allows the V2X system to use electric vehicle batteries in a manner that preserves battery health.

It should be understood that the terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method that uses temperature data to protect battery health during bidirectional charging events, the method comprising:

receiving at a processor temperature data, said temperature data comprising at least the temperature of one or more electric vehicle batteries or information required to determine the temperature of the one or more electric vehicle batteries;

determining anticipated energy needs of a building;

determining an amount of discharge of the one or more electric vehicle batteries required to offset the anticipated energy needs of the building by a predetermined amount;

determining based on the temperature data whether discharging the one or more electric vehicle batteries by the predetermined amount will be harmful to the health of the one or more electric vehicle batteries; and discharging the one or more electric vehicle batteries to offset the anticipated needs of the building if it is determined that discharging the one or more electric vehicle batteries by the predetermined amount will not be harmful to the health of the one or more electric vehicle batteries.

2. The method of claim 1, wherein the anticipated energy needs of the building are determined relative to ambient air temperature.

3. The method of claim 1, wherein determining anticipated energy needs of the building comprises:

analyzing weather data for the building, wherein the weather data comprises at least one of historic weather data and forecasted weather data; and determining a duration of at least one of (i) an electric load peak event that is about to occur at a meter behind which the charger is located and (ii) an electric load peak event on an opposite side of the meter from where the charger is located.

4. The method of claim 1, wherein determining anticipated energy needs of the building comprises:

identifying a pattern of electric peak load for the building based on an analysis of peak load data for the building; and predicting when an electric peak load event for the building is expected to occur based on the identified pattern.

5. The method of claim 4, wherein determining the amount of discharge of the one or more electric vehicle batteries required to offset the anticipated needs of the building by the predetermined amount comprises:

determining that one or more batteries in one or more electric vehicles are capable of discharging enough electricity to prevent the predicted electric peak load from occurring; and identifying the one or more vehicles in which the one or more batteries are capable of discharging enough electricity to prevent the predicted electric peak load from occurring.

6. The method of claim 5, further comprising preventing the one or more identified vehicles from being used for a purpose other than preventing the predicted peak load by at least one of instructing a fleet manager that the one or more identified vehicles should remain at the building, disabling the one or more identified vehicles for a purpose than preventing the predicted peak load, and locking a locking mechanism that is configured to prevent the one or more identified vehicles from being disconnected from the charger when the predicted electric peak load is expected to occur.

7. An apparatus that uses temperature data to protect battery health during bidirectional charging events, the apparatus comprising:

a processor; and a memory communicatively coupled to the processor, the memory comprising instructions that, when executed by the processor, are configured to cause the processor to:

receive temperature data, said temperature data comprising at least the temperature of one or more electric vehicle batteries or information required to determine the temperature of the one or more electric vehicle batteries;

determine anticipated energy needs of a building;

determine an amount of discharge of the one or more electric vehicle batteries required to offset the anticipated energy needs of the building by a predetermined amount;

determine based on the temperature data whether discharging the one or more electric vehicle batteries by the predetermined amount will be harmful to the health of the one or more electric vehicle batteries; and discharge the one or more electric vehicle batteries to offset the anticipated needs of the building if it is determined that discharging the one or more electric vehicle batteries by the predetermined amount will not be harmful to the health of the one or more electric vehicle batteries.

8. The apparatus of claim 7, wherein the anticipated energy needs of the building are determined relative to ambient air temperature.

9. The apparatus of claim 7, wherein the instructions are configured to cause the processor to determine the anticipated energy needs of the building by:

analyzing weather data for the building, wherein the weather data comprises at least one of historic weather data and forecasted weather data; and determining a duration of at least one of (i) an electric load peak event that is about to occur at a meter behind which the charger is located and (ii) an electric load peak event on an opposite side of the meter from where the charger is located.

10. The apparatus of claim 7, wherein the instructions are configured to cause the processor to determine the anticipated energy needs of the building by:

identifying a pattern of electric peak load for the building based on an analysis of historic peak load data for the building;

predicting when an electric peak load event for the building is going to occur based on the identified pattern.

11. The apparatus of claim 10, wherein the instructions are configured to cause the processor to determine the amount of discharge of the one or more electric vehicle batteries required to offset the anticipated needs of the building by the predetermined amount by:

determining that one or more batteries in one or more electric vehicles are capable of discharging enough electricity to prevent the predicted electric peak load from occurring; and identifying the one or more vehicles in which the one or more batteries are capable of discharging enough electricity to prevent the predicted electric peak load from occurring.

12. A system connected to an electric grid that uses temperature data to protect battery health during bidirectional charging events, the system comprising:

a charger comprising an operations management component, wherein the operations management component comprises a processor in communication with one or more electric vehicles, wherein the processor is programmed to:

receive temperature data, said temperature data comprising at least the temperature of one or more electric vehicle batteries of the one or more electric vehicles or information required to determine the temperature of the one or more electric vehicle batteries;

determine anticipated energy needs of a building;

determine an amount of discharge of the one or more electric vehicle batteries required to offset the anticipated needs of the building by a predetermined amount;

determine based on the temperature data whether discharging the one or more electric vehicle batteries by the predetermined amount will be harmful to the health of the one or more electric vehicle batteries; and discharge the electric vehicle battery to offset the anticipated needs of the building if it is determined that discharging the one or more electric vehicle batteries by the predetermined amount will not be harmful to the health of the one or more electric vehicle batteries.

13. The system of claim 12, wherein the anticipated energy needs of the building are determined relative to ambient air temperature.

14. The system of claim 12, wherein the instructions are configured to cause the processor to determine anticipated energy needs of the building by:

analyzing weather data for the building, wherein the weather data comprises at least one of historic weather data and forecasted weather data; and determining a duration of at least one of (i) an electric load peak event that is about to occur at a meter behind which the charger is located and (ii) an electric load peak event beyond the meter, including but not limited to a utility or the electric grid.

15. The system of claim 12, wherein the instructions are configured to cause the processor to determine anticipated energy needs of the building by:

identifying a pattern of electric peak load for the building based on an analysis of historic electric peak load data for the building; and predicting when an electric peak load event for the building is going to occur based on the identified pattern.

16. The system of claim 15, wherein the instructions are configured to cause the processor to determine the amount of discharge of the one or more electric vehicle batteries required to offset the anticipated needs of the building by the predetermined amount by:

determining that one or more batteries in one or more electric vehicles are capable of discharging enough electricity to prevent the predicted electric peak load from occurring; and identifying the one or more vehicles in which the one or more batteries are capable of discharging enough electricity to prevent the predicted electric peak load from occurring.

17. The system of claim 16, further comprising:

a locking mechanism, wherein the locking mechanism automatically prevents the one or more identified vehicles from being disconnected from the charger when the predicted electric peak load is expected to occur.

18. The system of claim 15, wherein the charger communicates bi-directionally with the one or more electric vehicles.

19. The system of claim 17, wherein the charger comprises a bi-directional power conversion structure, wherein the bi-directional power conversion structure comprises at least one interconnect device configured to charge the one or more electric vehicle batteries from the electric grid or discharge energy stored at the one or more electric vehicle batteries back into the electric grid or the building.

20. The system of claim 15, wherein the instructions are configured to cause the processor to determine based on the temperature data whether discharging the one or more electric vehicle batteries by the predetermined amount will be harmful to the health of the one or more electric vehicle batteries by:

determining that a first electric vehicle battery of the one or more electric vehicle batteries should not be discharged; and causing a first electric vehicle not to connect to the charger in order to ensure the charger remains open for one or more electric vehicle batteries that may be discharged, wherein the first electric vehicle contains the first electric vehicle battery.

\* \* \* \* \*